United States Patent
Atwood et al.

(10) Patent No.: US 10,427,434 B2
(45) Date of Patent: Oct. 1, 2019

(54) PRINTING MODULE REPLACEMENT CART

(71) Applicant: Xerox Corporation, Norwalk, CT (US)

(72) Inventors: Christopher D. Atwood, Rochester, NY (US); Wayne D. Drinkwater, Fairport, NY (US); Mark A. Adiletta, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 344 days.

(21) Appl. No.: 15/205,064

(22) Filed: Jul. 8, 2016

(65) Prior Publication Data

US 2018/0009247 A1    Jan. 11, 2018

(51) Int. Cl.
  B41J 29/06   (2006.01)
  B62B 3/10   (2006.01)

(52) U.S. Cl.
  CPC .............. B41J 29/06 (2013.01); B62B 3/10 (2013.01); B62B 2206/06 (2013.01)

(58) Field of Classification Search
  CPC ......... B41J 29/06; B62B 1/00; B62B 2206/06
  See application file for complete search history.

(56) References Cited

U.S. PATENT DOCUMENTS

| | | |
|---|---|---|
| 4,671,728 A | 6/1987 | Clark et al. |
| 5,144,369 A | 9/1992 | Benedict et al. |
| 5,622,470 A | 4/1997 | Schaefer et al. |
| 5,630,578 A | 5/1997 | Naramore et al. |
| 6,033,175 A | 3/2000 | Pflueger et al. |
| 6,089,812 A | 7/2000 | Junker |
| 6,102,647 A | 8/2000 | Yap |
| 6,394,743 B1 | 5/2002 | Marsden et al. |
| 6,736,584 B2 | 5/2004 | Dehn et al. |
| 7,290,777 B2 | 11/2007 | Preston et al. |
| 8,919,582 B1 | 12/2014 | Kmetz, III et al. |
| 2008/0014072 A1 | 1/2008 | Seggem |
| 2011/0264927 A1* | 10/2011 | Dearborn .............. G06F 1/1632 713/300 |
| 2015/0008809 A1* | 1/2015 | Palumbo .................. B41J 2/165 312/236 |
| 2015/0375531 A1* | 12/2015 | Izawa .................... B41J 3/4078 347/102 |

* cited by examiner

*Primary Examiner* — Saul Rodriguez
*Assistant Examiner* — Ashley K Romano
(74) *Attorney, Agent, or Firm* — Gibb & Riley, LLC

(57) ABSTRACT

A height adjuster moves a platform along a cart frame, and the platform contacts an alignment stop when the platform is in a loading position on the cart frame. Platform slots are connected to the platform, and the platform slots are sized and shaped to match the size and shape of linear projections of a replaceable printing module. Clamps are sized and shaped to connect to connection points of a printing device and align the cart frame to the printer frame. The platform slots are positioned by the platform to be aligned with housing slots of the printing device when the clamps connect the transport cart to the printing device, and when the platform contacts the alignment stop (and is in the loading position) this allow the replaceable printing module to be transferred between the transport cart and the printing device.

20 Claims, 17 Drawing Sheets

PRINTING MODULE REPLACEMENT CART

BACKGROUND

Systems and methods herein generally relate to printers that use replaceable printing modules and more particularly to a cart used in the replacement of printing modules.

In order to print using colors other than the printer's permanent colors that are used for all print jobs, or the vast majority of print jobs (e.g., colors other than red, green, blue (RGB); other than cyan, yellow, magenta, black (CMYK); etc.), such as clear, indigo, etc., some printers require removal of a printing module and a multi-hour cleaning process. However, other printers include an additional housing (sometimes referred to as the $5^{th}$ color housing, or $X^{th}$ housing if more than 5 are enabled) for replaceable printing modules (sometimes referred to as a customer replaceable unit (CCU), $5^{th}$ color module, or imaging media cartridges) that is separate from the permanent color printing modules, and that allows switching of replaceable printing modules seamlessly in minutes.

While the main printing modules for the printer's permanent colors are used for all print jobs and are not replaceable by printer users (are only replaceable by repair professionals), the replaceable printing modules used in the additional housing print colors that only appear in a limited number of specialty print jobs. However, the replaceable printing modules can be heavy and awkward to replace (for example, the CCU can weigh over 80 lb., and may have to be installed at 65 inches above the floor) and a transport cart can assist in the replacement task.

SUMMARY

An exemplary transport cart herein includes, among other components, a cart frame having a top at one end, and a bottom at the other end (opposite the top). Wheels are connected to the bottom of the cart frame, and the wheels contact the surface (e.g., floor) on which the transport cart travels. Also, a vertically movable platform is connected to the cart frame between the top and the bottom, and a height adjuster is connected to the platform. The height adjuster moves the platform along the cart frame in opposite directions between the bottom and the top. For example, the height adjuster can include a winch, cable, and pulleys; hydraulic adjusters; electrical motor adjusters/actuators, etc.

In some structures, an alignment stop is connected to the cart frame between the bottom and the top. The platform contacts the alignment stop when the platform is in a loading position (on the cart frame between the bottom and the top). A visual indicator, which is connected to the alignment stop, changes color when the platform is in the loading position.

Slots are part of (or are connected to) the platform, and are referred to herein as "platform slots." The platform slots are sized and shaped to match the size and shape of linear projections of the replaceable printing module. For example, the linear projections can be bars, rods, beams, etc., and can be part of, or attached to, the replaceable printing module.

Clamps are connected to the top and the bottom of the cart frame (e.g., at least one clamp at the top of the cart frame, and two clamps at the bottom of the cart frame). The clamps are sized and shaped to connect to locations of the frame of a printing device. The clamps align the cart frame to the printer frame.

When the clamps connect the transport cart to the printing device, and when the platform contacts the alignment stop (and is in the loading position), the platform slots are positioned by the platform to be aligned with housing slots of the printing device, and this allows the replaceable printing module to be easily transferred (manually or mechanically) between the transport cart and the printing device. The replaceable printing module is capable of being slid between the platform slots and the housing slots only when the platform slots are aligned with the housing slots. The printing device is positioned on the surface and the clamps align the platform slots with the housing slots regardless of irregularities of the surface.

After the replaceable printing module is mounted within the printing device, the linear projections of the replaceable printing module are held by the housing slots. Thus, the replaceable printing module is held by the linear projections when the linear projections are within the platform slots or the housing slots.

In methods of using a transport cart herein, users move a frame having wheels connected to the bottom of the frame. The wheels contact the surface on which the transport cart travels. In such methods users move a platform connected to the frame (between the top and the bottom of the frame) using a height adjuster connected to the platform. The height adjuster moves the platform along the frame in opposite directions between the bottom and the top.

The users load a print module on platform slots connected to the platform in these methods. The platform slots are sized and shaped to match the size and shape of linear projections of the print module. Also, in such methods, users move the platform until the platform contacts an alignment stop connected to the frame between the bottom and the top (using a winch, cable, and pulleys; hydraulic adjusters; electrical motor adjusters, etc.). The platform contacts the alignment stop when the platform is in a loading position on the frame between the bottom and the top. In such methods, users observe a visual indicator connected to the alignment stop that changes color when the platform is in the loading position.

The methods call for the users to clamp the transport cart to a printing device, using clamps connected to the top and the bottom (e.g., for example, using at least one clamp connected to the top of the frame and two clamps connected to the bottom of the frame, etc.). The clamps are sized and shaped to connect to connection points of the printing device. When the clamps connect the transport cart to the printing device and when the platform contacts the alignment stop (and is in the loading position), the platform slots are automatically positioned by the platform to be aligned with housing slots of the printing device. The printing device is positioned on the surface and the clamping aligns the platform slots with the housing slots regardless of irregularities of the surface. Thus, in these methods, the users easily slide the print module between the platform slots and the housing slots when the platform slots are aligned with the housing slots. The replaceable printing module is held by the linear projections when the linear projections are within the platform slots or the housing slots.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, replaceable printing modules can be heavy and awkward to replace, often exceeding regulatory guidelines for safe lifting procedures. In order to change the replaceable printing modules on print engines, a dedicated cart can be adjusted through a laborious process to align with a single printing machine. The alignment between rails of the print engine and the replaceable printing modules is central to successful removal of the replaceable printing modules. For example, professional repair personnel can set up a specific cart to match a specific print engine. Each printer/cart alignment is a unique setup, due to variations in print engine set up height, variations in the floor height and angle, and tolerances within the print engine and cart manufacturing. The time to setup a cart and rack can exceed 2 hours of professional repair personnel time, along with service calls if the alignment is lost.

To avoid the extensive amount of time involved with adjusting a cart to match a single machine, and the cost of having to purchase a differently adjusted cart for each printing machine, the design presented herein allows the same cart to be used for multiple print engines. This eliminates field setup, and thereby saves money, floor space, and time. Therefore, the carts described below are used for loading, transporting, and storing imaging media cartridges, and are capable of being docked with multiple print engines, without adjustment or field setup.

The carts described include spring loaded latching bracket catches that rigidly attach the cart to the print engine, allowing the cart to firmly dock to the print engine by making contact at several locations on the printer's frame. In order to make contact with the print engine, the cart may break contact with the floor at one or more of the wheels. Once the cart is firmly latched onto the print engine, the operator is able to easily and safely remove or insert a replaceable printing module. Because the cart is able to make positive locking contact with the print engine that is independent of the floor and machine setup variations, the cart can be used with multiple print engines.

Figure 1:
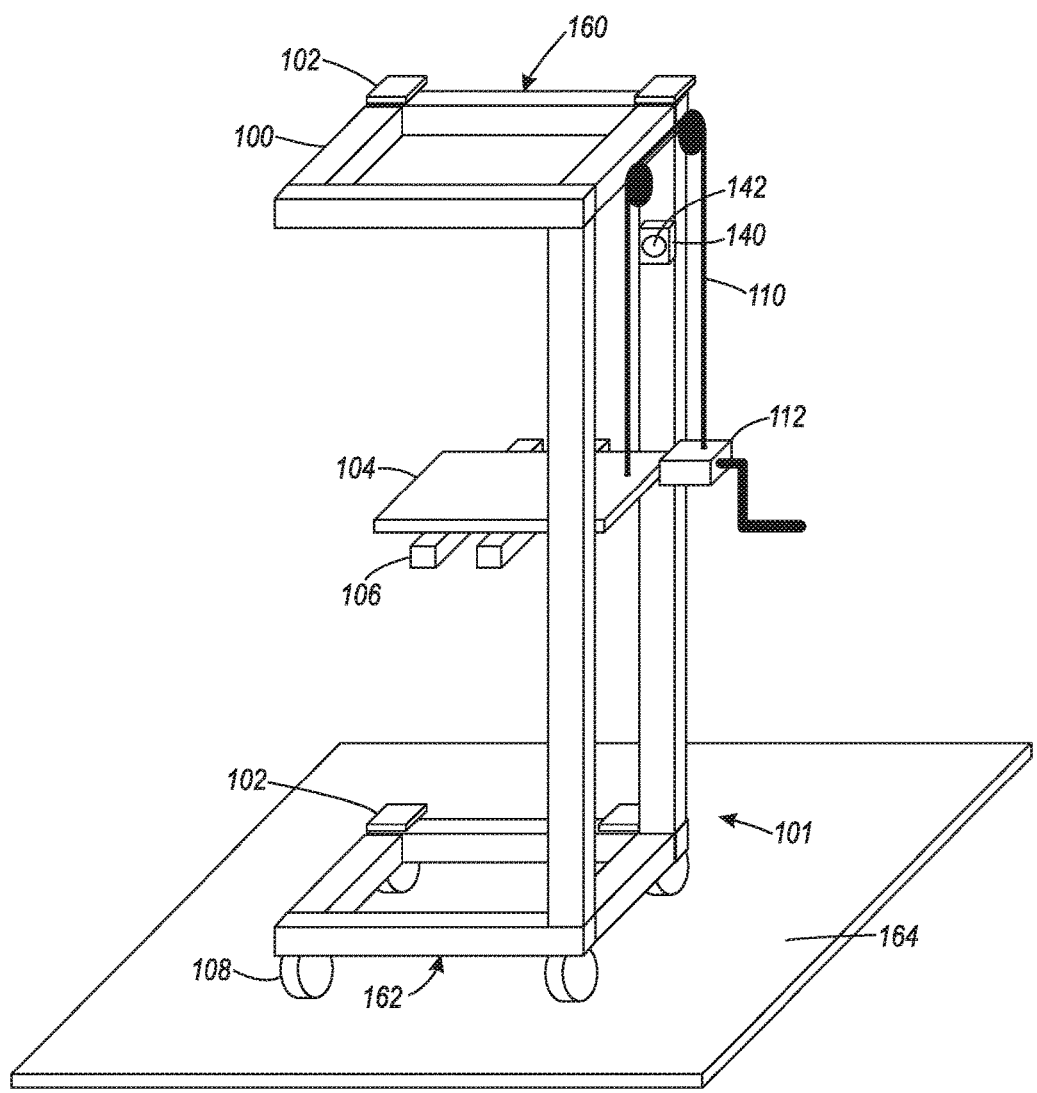
FIG. 1 is a perspective view schematic diagram illustrating a transport cart herein.

FIG. 1 illustrates that exemplary transport carts 101 herein include, among other components, a cart frame 100 having a top 160 at one end, and a bottom 162 at the other end (opposite the top 160). Wheels 108 are connected to the bottom 162 of the cart frame 100, and the wheels 108 contact the surface 164 (e.g., floor) on which the transport cart 101 travels. Also, a vertically movable platform 104 is connected to the cart frame 100 between the top 160 and the bottom 162, and a height adjuster 112 is connected to the platform 104. The height adjuster 112 moves the platform 104 along the cart frame 100 in opposite directions between the bottom 162 and the top 160. The height adjuster 112 can include a winch, cable, and pulleys 110. Slots 106 are part of (or are connected to) the platform 104, and are referred to herein as "platform slots 106."

In some structures, an alignment stop 140 is connected to the cart frame 100 between the bottom 162 and the top 160. The platform 104 contacts the alignment stop 140 when the platform 104 is in a loading position (on the cart frame 100 between the bottom 162 and the top 160). A visual indicator 142, which is connected to the alignment stop 140, changes color when the platform 104 is in the loading position.

Figure 2:
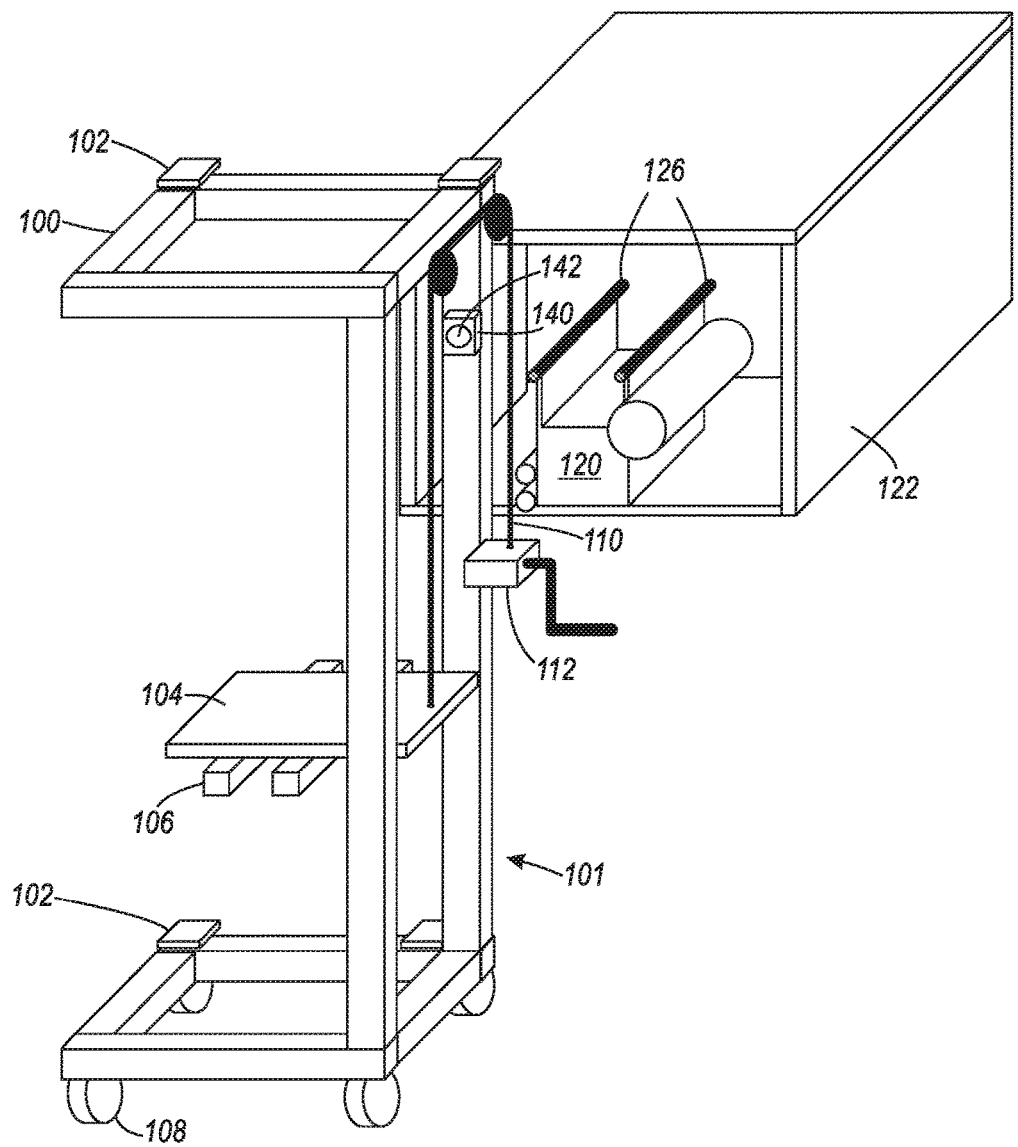
FIGS. 2 and 3 are perspective view schematic diagrams illustrating a transport cart and storage unit herein.
Figure 3:
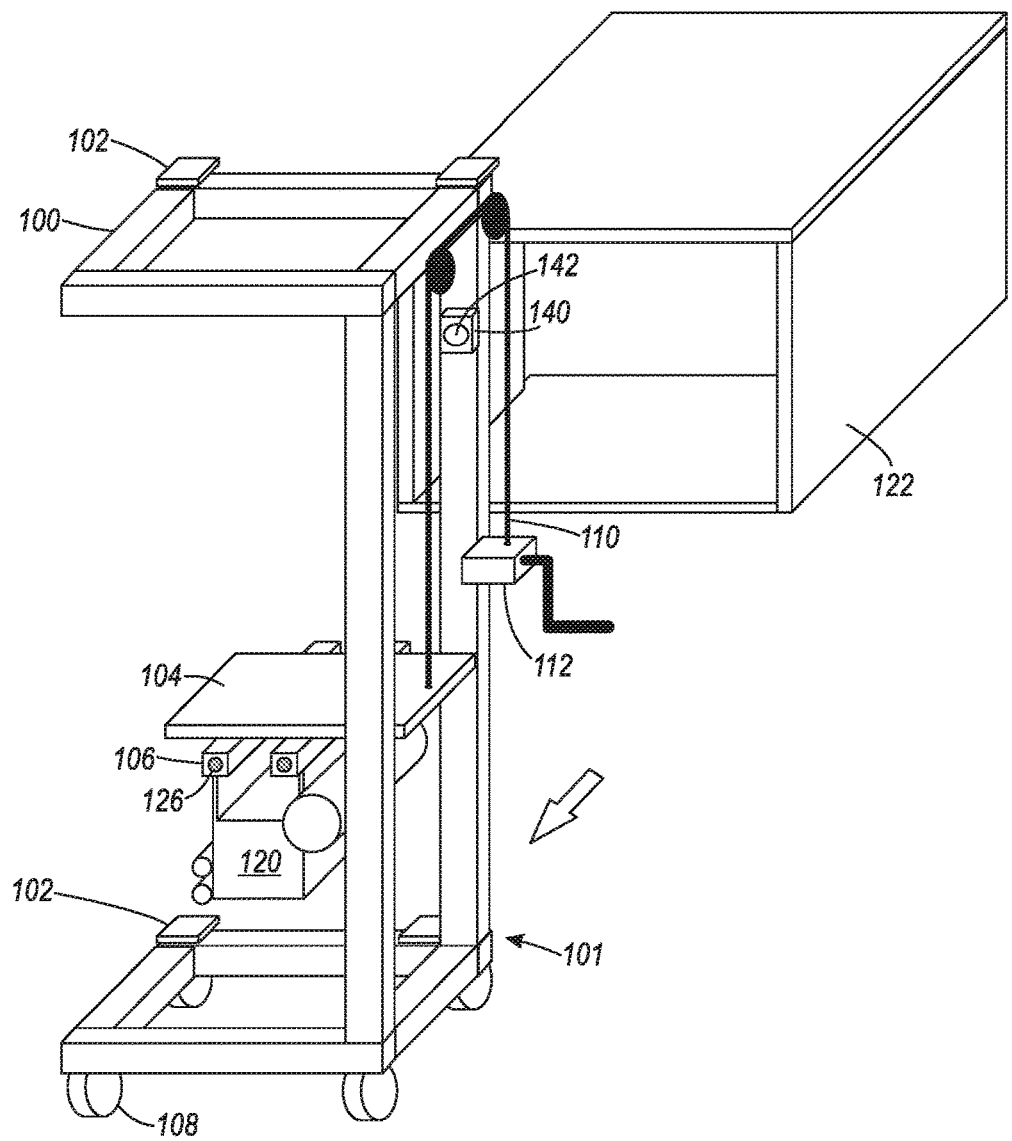

FIG. 2 illustrates the cart 101 shown in FIG. 1 positioned next to a storage device 122 that stores one or more replaceable printing modules 120. The replaceable printing module 120 includes linear projections 126. For example, the linear projections 126 can be bars, rods, beams, etc., and can be part of, or attached to, the replaceable printing module 120. The platform slots 106 are sized and shaped to match the size and shape of the linear projections 126 of the replaceable printing module 120, allowing the platform slots 106 to hold the replaceable printing module 120 by the linear projections, as shown in FIG. 3. Thus, FIGS. 2 and 3 illustrate that the replaceable printing module 120 can be transferred from the storage device 122 to the platform slots 106 of the cart 101.

Figure 4:
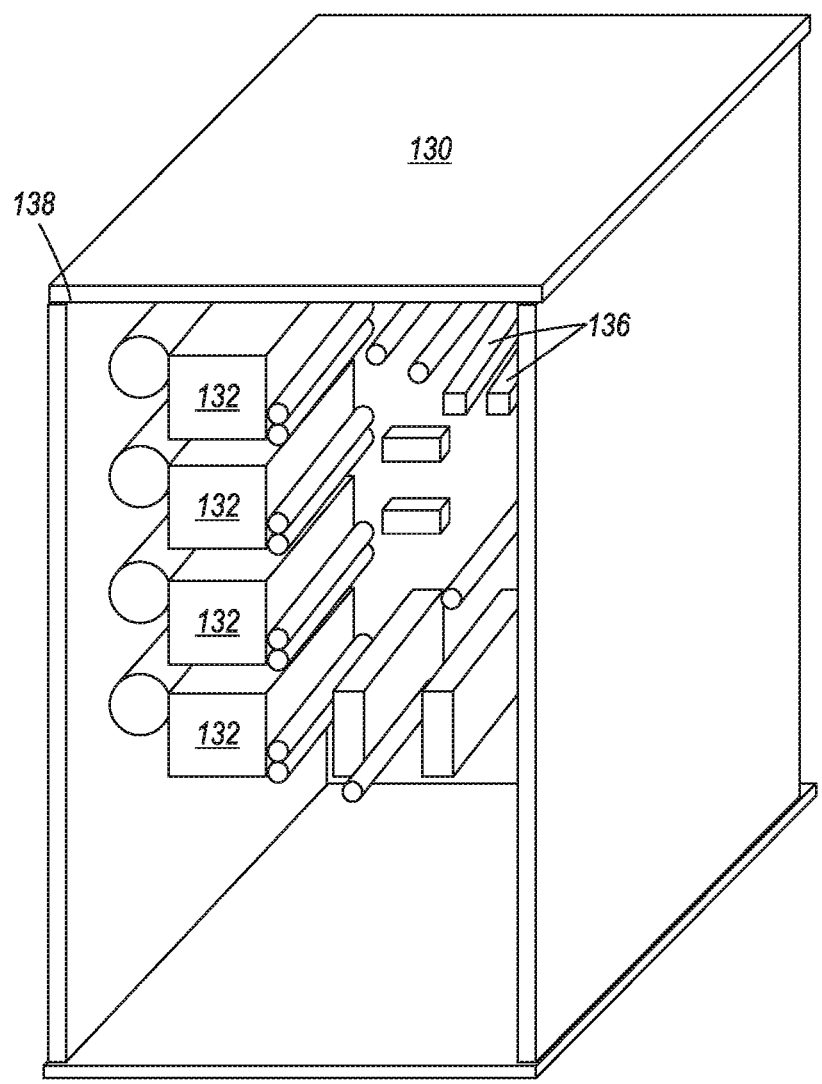
FIG. 4 is a perspective view schematic diagram illustrating a printing device herein.

FIG. 4 illustrates a printing device 130 (which is sometimes referred to as an image output terminal) having a frame 138. The printing device 130 includes various main (permanent) printing modules 132 that print using the printer's permanent colors. The main printing modules 132 are used for virtually all print jobs, and are not replaceable by printer users, and are only replaceable by repair professionals. The replaceable printing modules 120 are sometimes positioned in an additional housing area of the printing device 130, and print using colors that only appear in a limited number of specialty print jobs. The additional housing area includes housing slots 136, which are similarly sized and shaped to match the size and shape of the linear projections 126 of the replaceable printing module 120, allowing the housing slots 136 to hold the replaceable printing module 120 by the linear projections 126.

Figure 5:
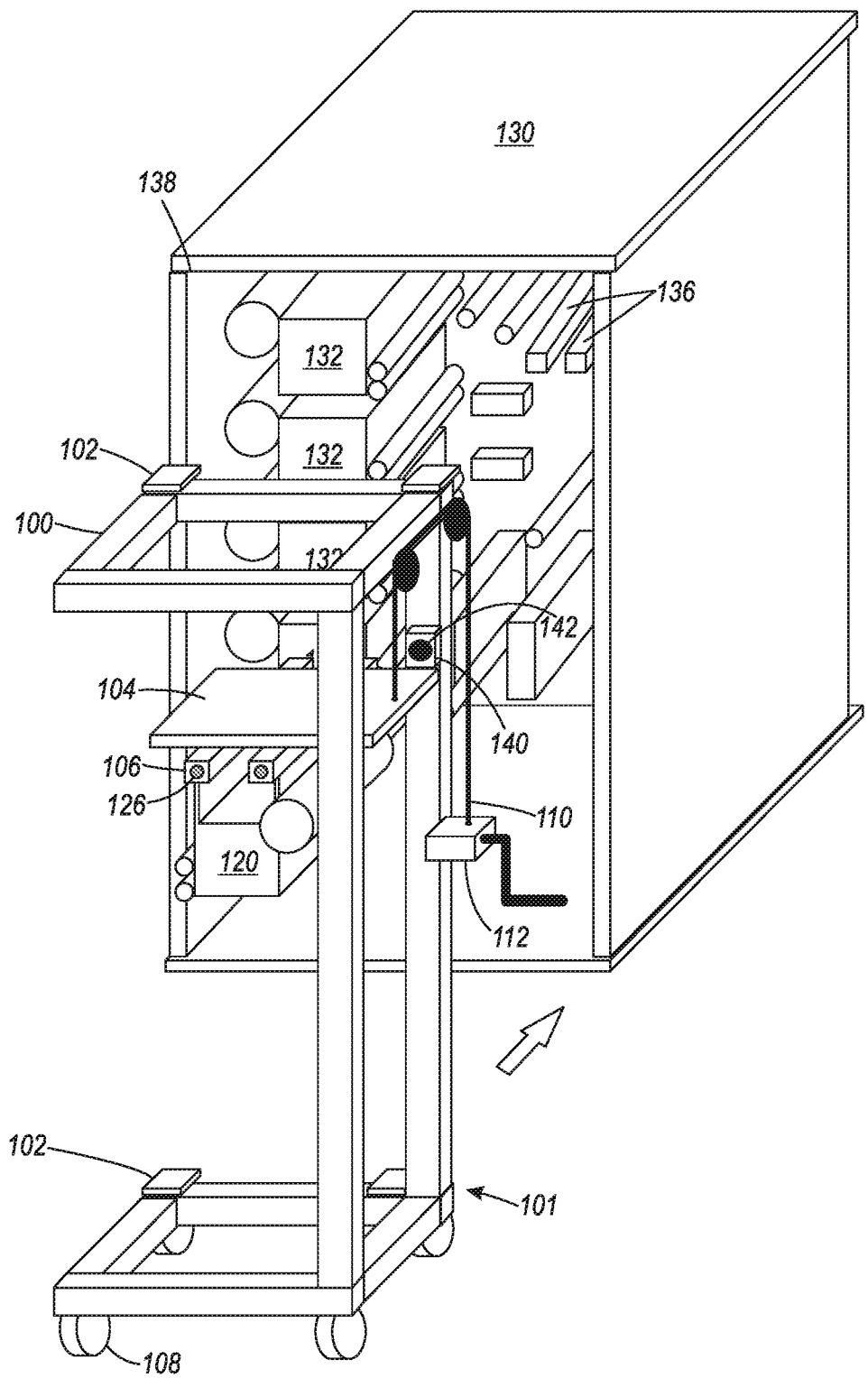
FIG. 5 is a perspective view schematic diagram illustrating a transport cart and printing device herein.
Figure 6:
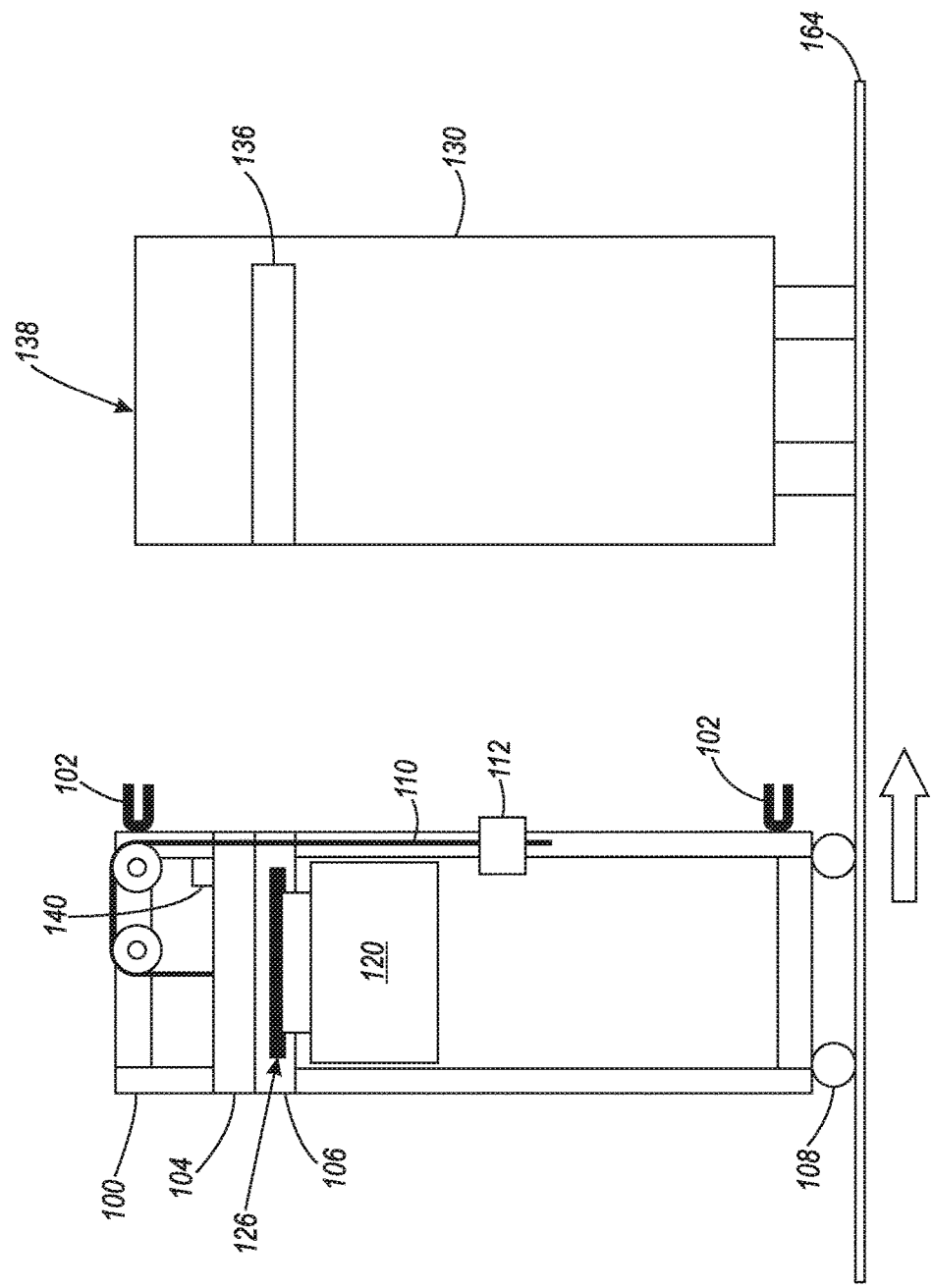
FIG. 6 is a side view schematic diagram illustrating a transport cart and printing device herein.
Figure 7:
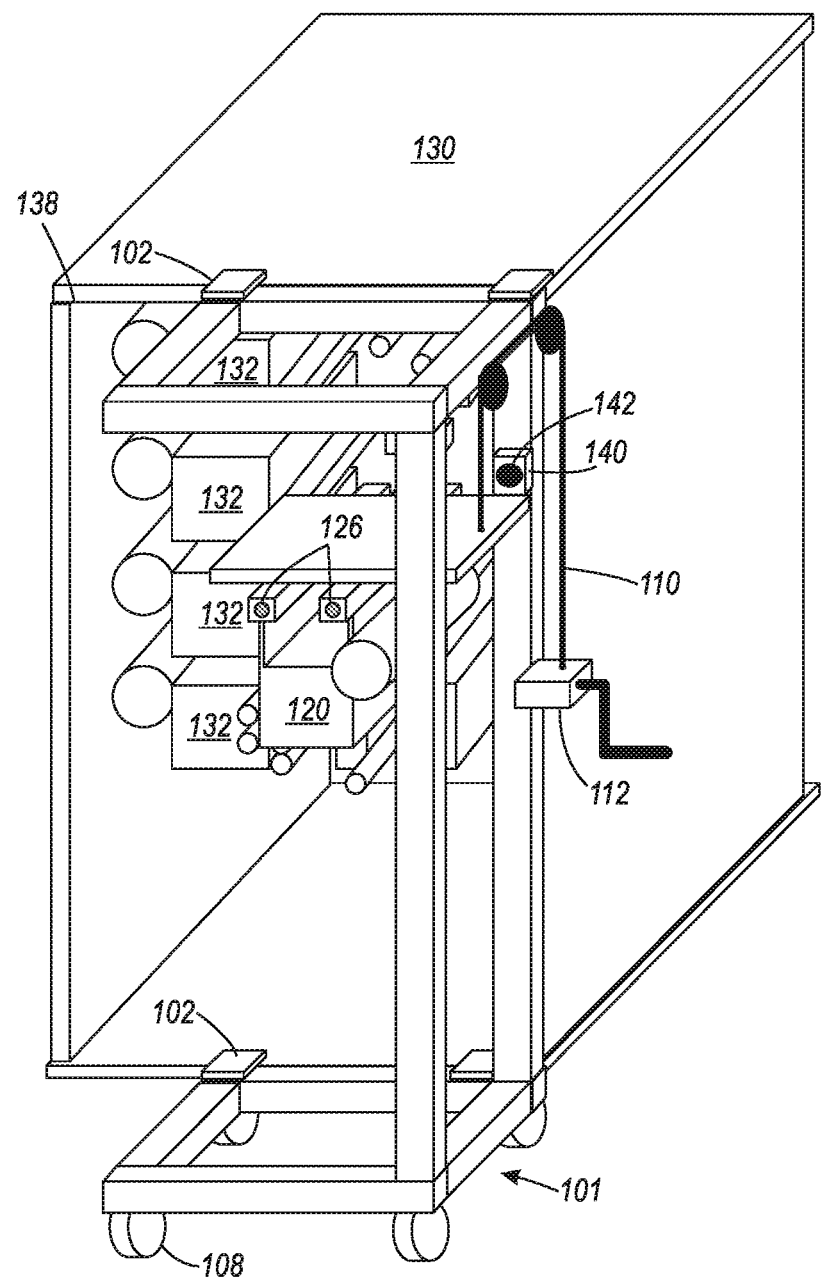
FIG. 7 is a perspective view schematic diagram illustrating a transport cart and printing device herein.
Figure 8:
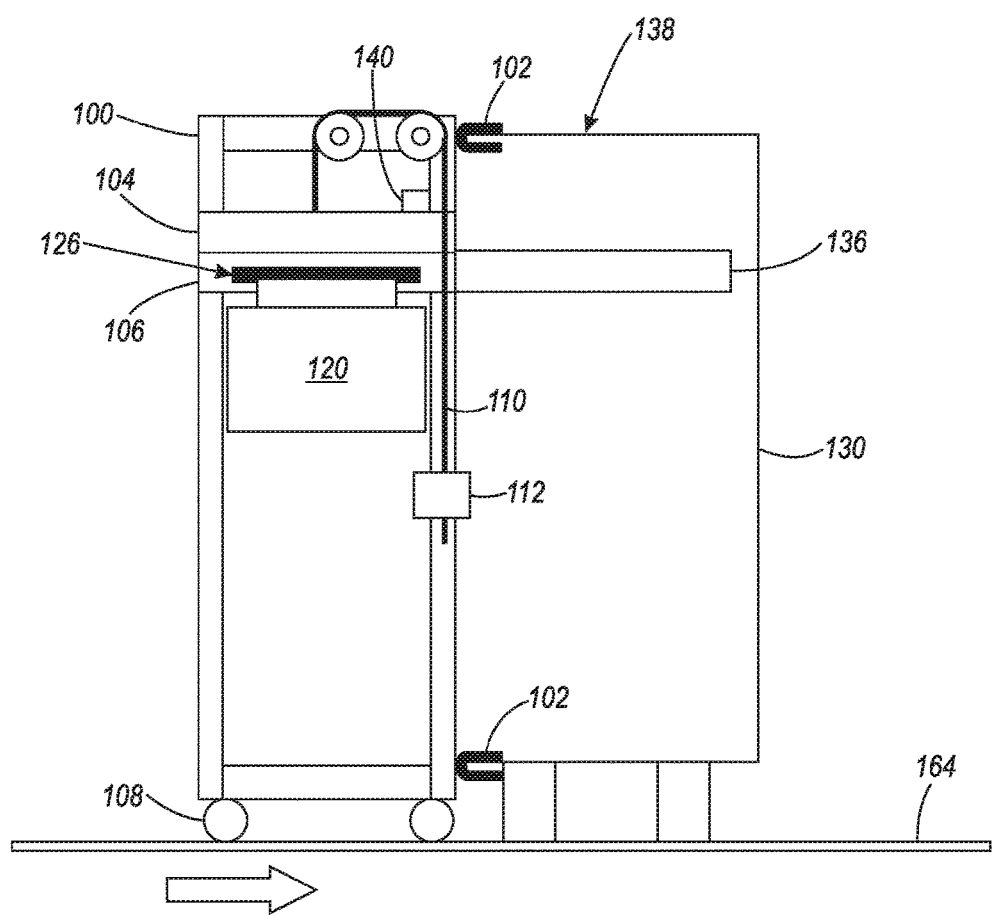
FIG. 8 is a side view schematic diagram illustrating a transport cart and printing device herein.

FIGS. 5 and 6 illustrate the cart 101 and printing device 130 adjacent one another using perspective (FIG. 5) and side (FIG. 6) views. As shown in FIGS. 5 and 6, the cart 101 holding a replaceable printing module 120 can be moved into position next to the printing device 130. FIGS. 7 and 8 illustrate the cart 101 and printing device 130 connected to one another using perspective (FIG. 7) and side (FIG. 8) views. As shown in FIGS. 7 and 8, the clamps 102 can temporarily connect the cart 101 to the printing device 130. The clamps 102 are connected to the top 160 and bottom 162 of the cart frame 100 (e.g., at least one clamp at the top 160 of the cart frame 100, and at least two clamps 102 at the bottom 162 of the cart frame 100).

Thus, as shown in FIGS. 7 and 8, the clamps 102 are sized and shaped to connect to locations of the frame 138 of a printing device 130. The clamps 102 align the cart frame 100 to the printer frame 138, and in doing so align the platform slots 106 with the housing slots 136 so that the platform slots 106 and the housing slots 136 are collinear. Thus, different carts 101 herein are designed for different types of printing devices 130, such that when each cart 101 is clamped to the frame 138 of a corresponding type of printing device 130 that the cart 101 matches, the platform slots 106 and the housing slots 136 are aligned to be collinear (without having to custom tune/align each individual cart 101 to each individual printing device 130).

Figure 9:
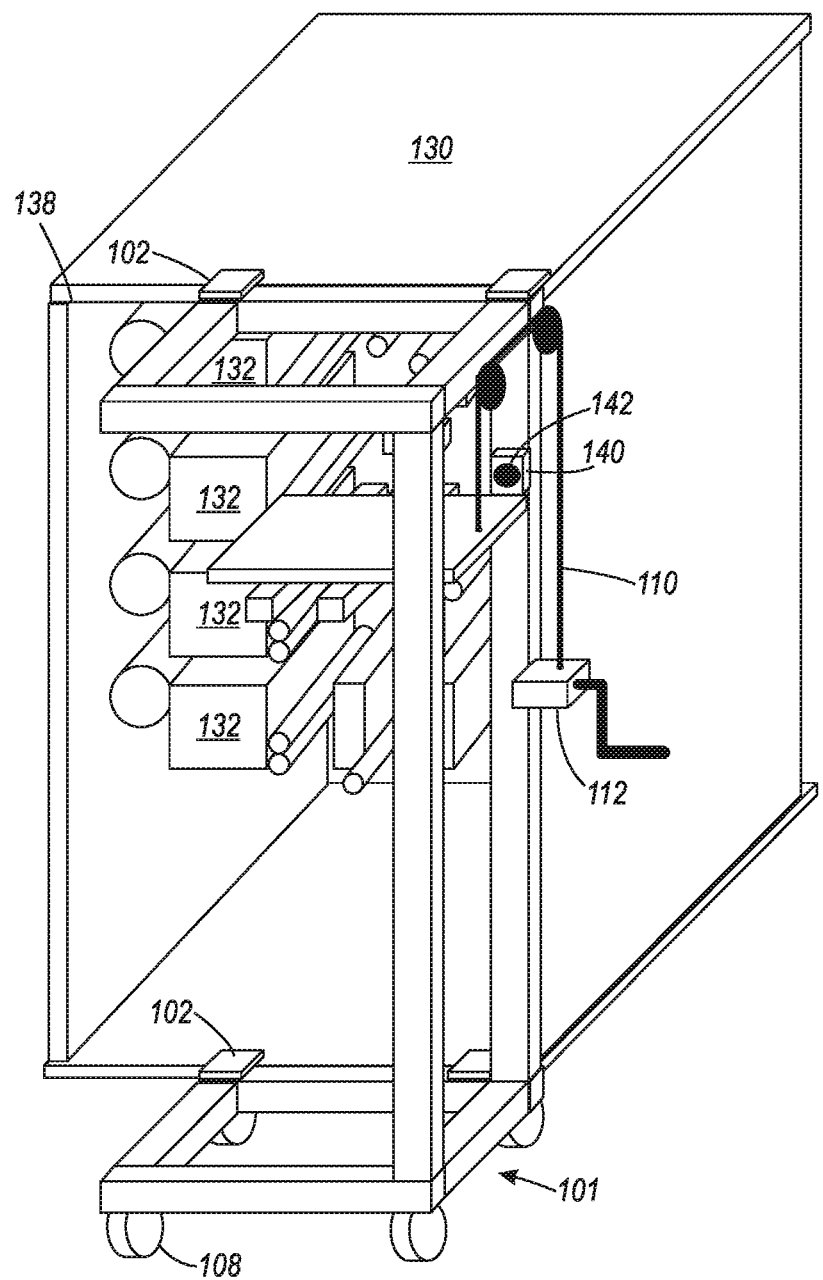
FIG. 9 is a perspective view schematic diagram illustrating a transport cart and printing device herein.
Figure 10:
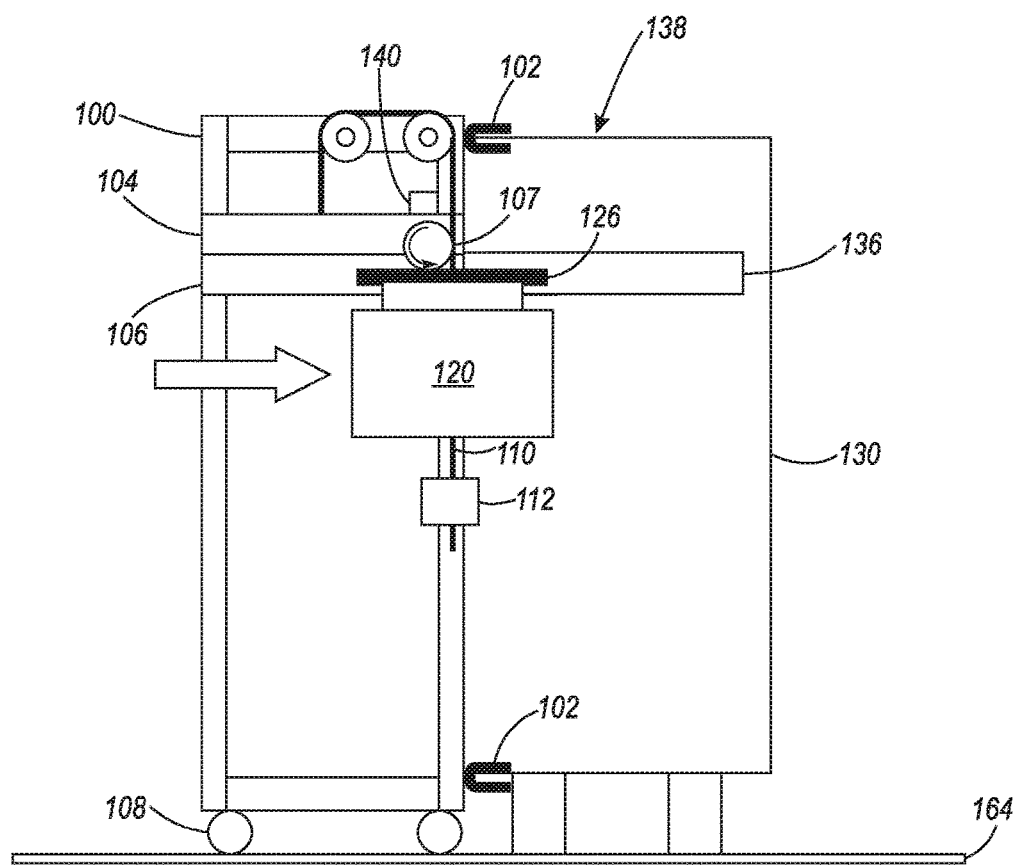
FIGS. 10 and 11 are side view schematic diagrams illustrating a transport cart and printing device herein.
Figure 11:
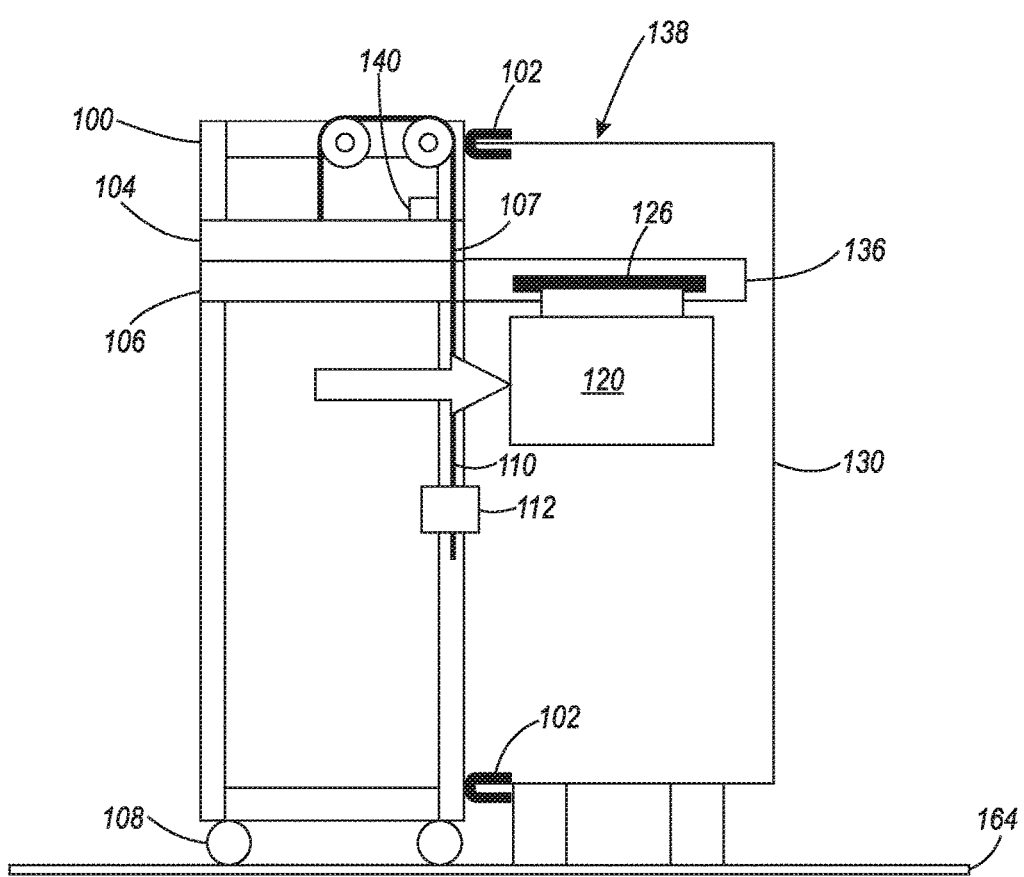

As shown in perspective view in FIG. 9, and in side view in FIGS. 10 and 11, when the clamps 102 connect the transport cart 101 to the printing device 130, and when the platform 104 contacts the alignment stop 140 (and is in the loading position), the platform slots 106 are positioned by the platform 104 to be aligned with the housing slots 136 of the printing device, and this allows the replaceable printing module 120 to be easily transferred (manually or mechanically) between the transport cart 101 and the printing device 130. The replaceable printing module 120 is capable of being slid between the platform slots 106 and the housing slots only when the platform slots 106 are aligned with the housing slots. The printing device 130 is positioned on the surface 164 and the clamps 102 align the platform slots 106 with the housing slots regardless of irregularities of the surface 164.

For example, the user can push or pull the replaceable printing module along the collinear platform slots 106 and the housing slots 136, or an optional motor 107 (optional, and only shown in FIG. 10) can drive the replaceable printing module along the collinear platform slots 106 and the housing slots 136. The motor 107 can be a rotating wheel, electromagnets within the platform slots 106 and the housing slots 136, pneumatic, hydraulic, or electric actuators, etc.

Figure 12:
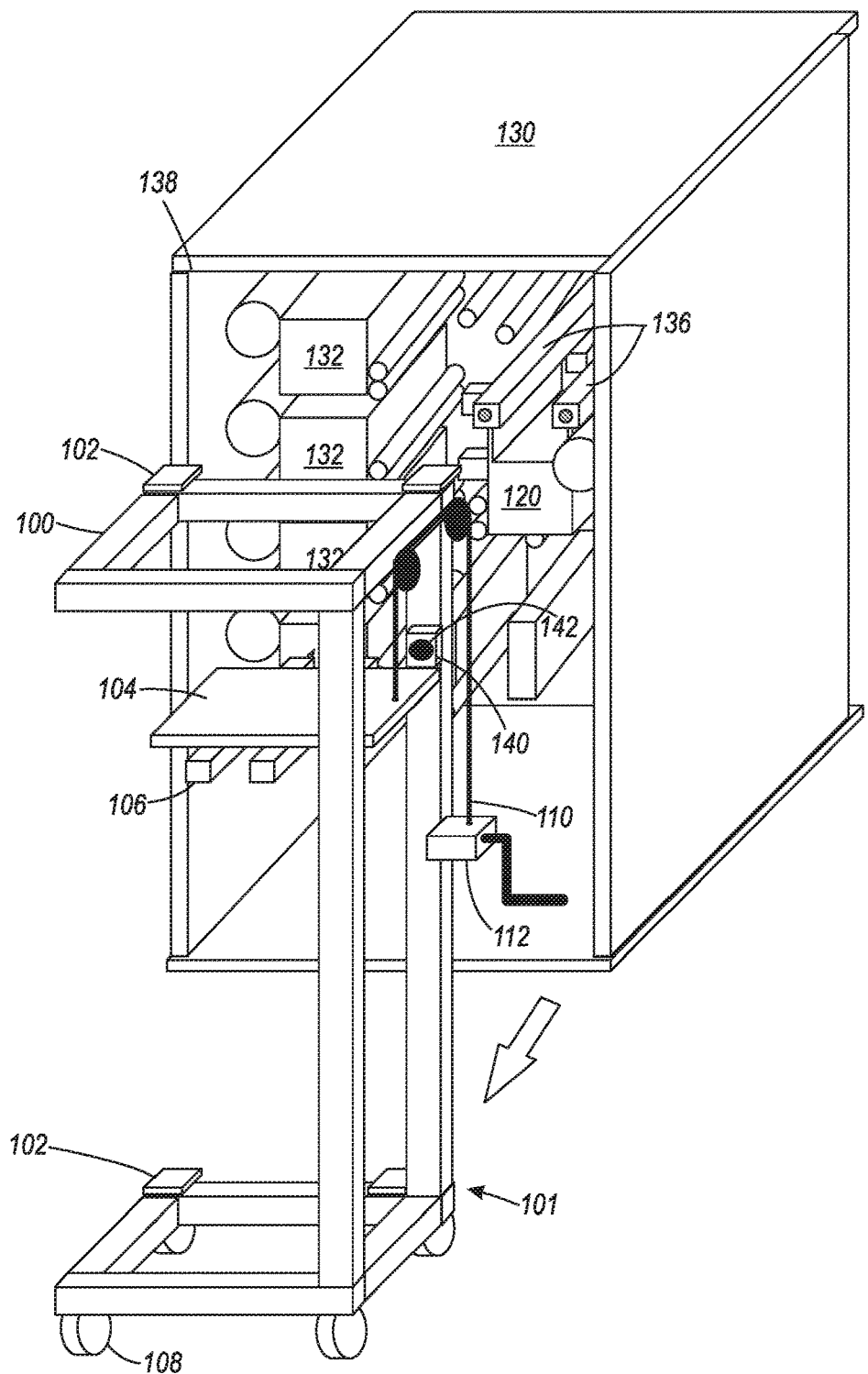
FIG. 12 is a perspective view schematic diagram illustrating a transport cart and printing device herein.

As shown in FIG. 12, after the replaceable printing module 120 is mounted within the printing device 130, the linear projections 126 of the replaceable printing module 120 are held by the housing slots 136. Thus, the replaceable printing module 120 is held by the linear projections 126 when the linear projections 126 are within the platform slots 106 or the housing slots 136.

Figure 13:
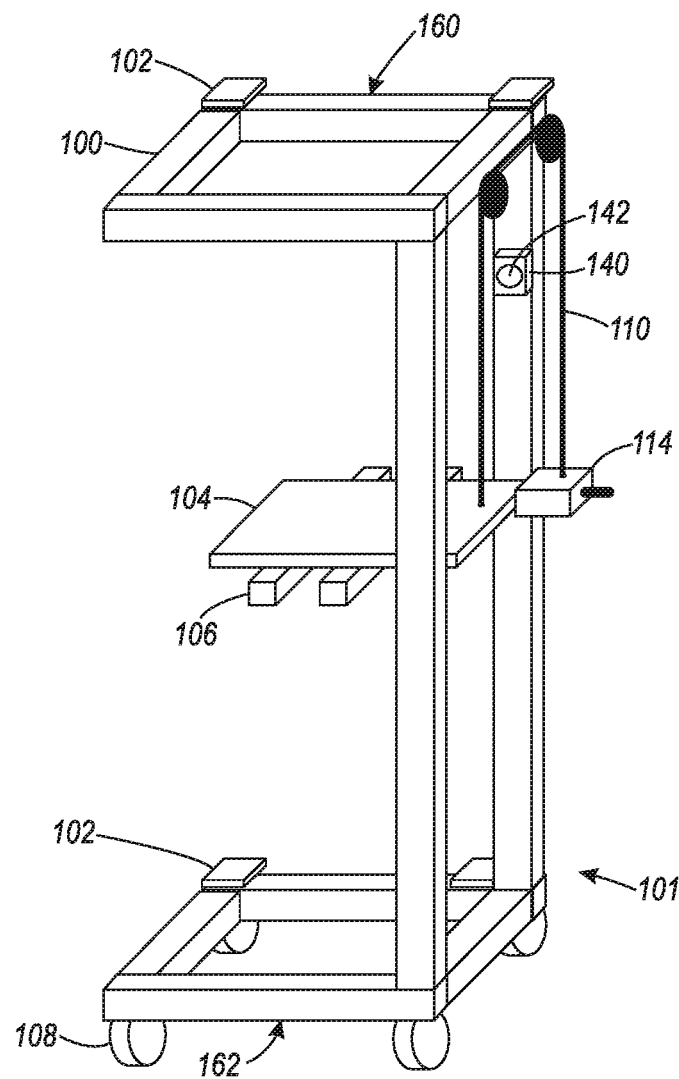
FIGS. 13 and 14 are perspective view schematic diagrams illustrating a transport cart herein.
Figure 14:
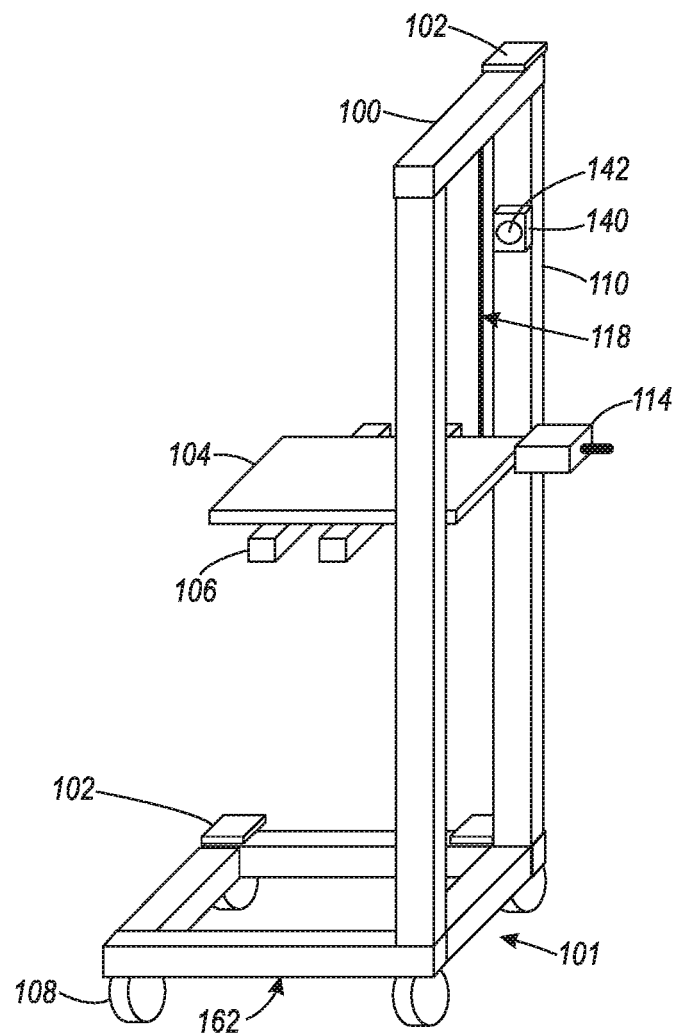

As noted above, the height adjuster 112 can include a manually wound winch, cable, and pulleys 110 (shown in FIG. 1). Alternatively, as shown in FIG. 13, the height adjuster 114 can be an electric motor that actuates the winch; or, as shown in FIG. 14, the height adjuster 116, can be pneumatic, hydraulic, etc., motors that power one or more actuators 118. FIG. 14 also illustrates that a single clamp 102 can be used at the top of the cart 101.

Figure 15A:
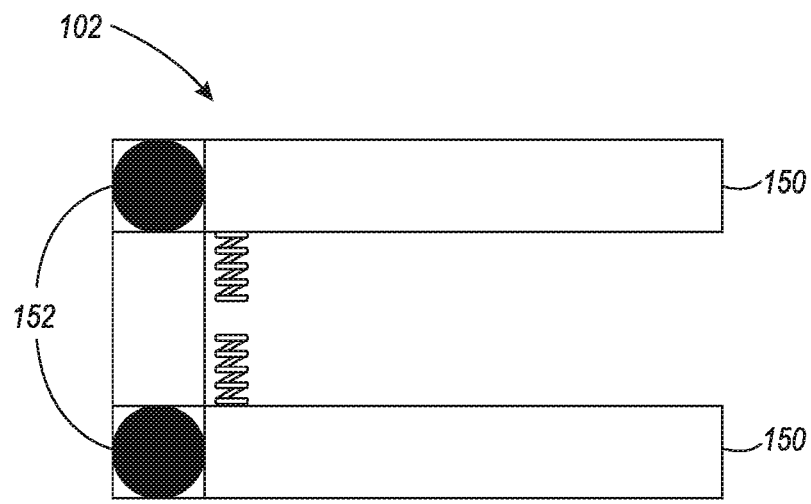
FIGS. 15A-17 are perspective view schematic diagrams illustrating clamps herein.
Figure 15B:
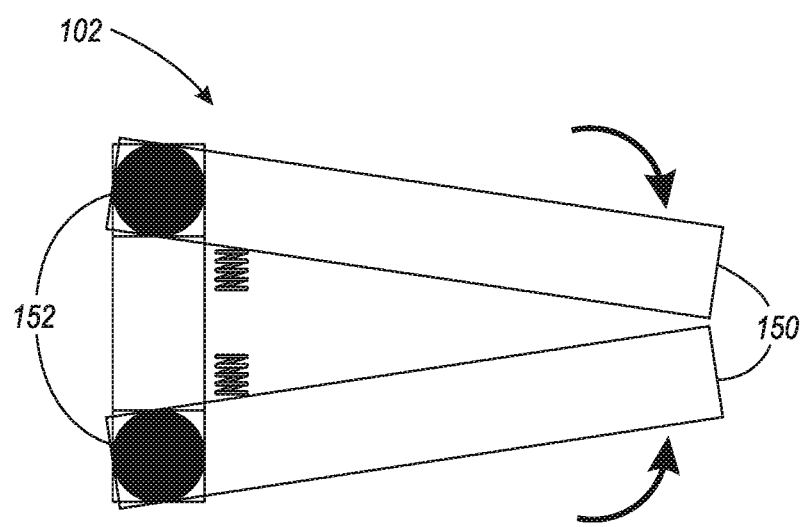
Figure 16:
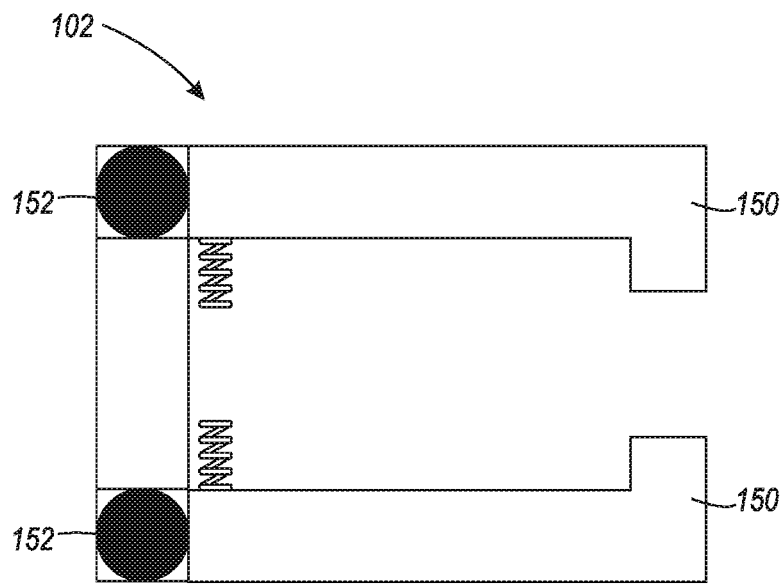
Figure 17:
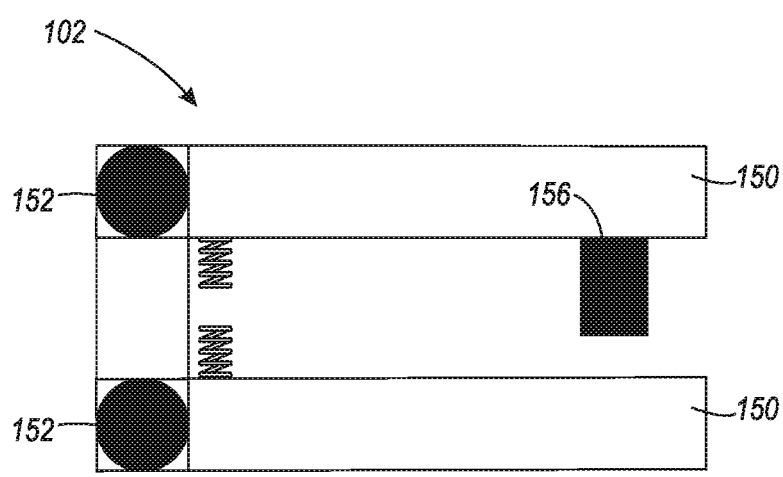

Many different types of clamps 102 can be used with the structures herein. For example, as shown in FIGS. 15A and 15B spring loaded or motorized clamp arms 152 connected to hinges 150 open and close to lock the cart 101 to the printer frame 138. In other options, the arms 154 can have hook shapes (FIG. 16) or can include projections 156 (FIG. 17) to help lock the cart 101 to the printer frame 138.

Figure 18:
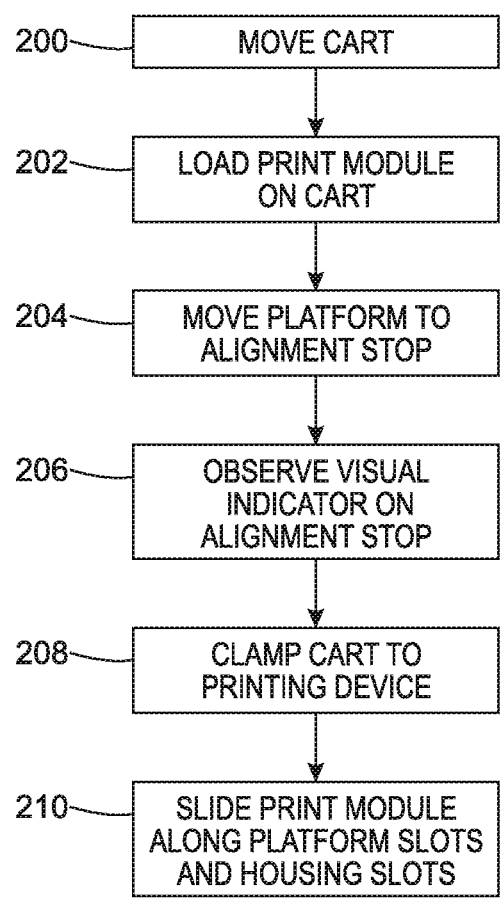
FIG. 18 is a flow diagram of various methods herein.

FIG. 18 is flowchart illustrating exemplary methods of using a transport cart herein. As shown in item 200, a user moves the cart on the wheels connected to the bottom of the frame. The wheels contact the surface on which the transport cart travels. In item 202, the users load a print module on platform slots connected to the platform. The platform slots are sized and shaped to match the size and shape of linear projections of the print module.

In item 204, the user moves the platform connected to the frame (between the top and the bottom of the frame) using the height adjuster connected to the platform, until the platform contacts the alignment stop on the frame between the bottom and the top (using a winch, cable, and pulleys; hydraulic adjusters; electrical motor adjusters, etc.). The platform contacts the alignment stop when the platform is in a loading position on the frame between the bottom and the top, and at that point (as shown in item 206), the user observes a visual indicator connected to the alignment stop that changes color when the platform is in the loading position.

In item 208, the user clamps the transport cart to the printing device, using the clamps connected to the top and the bottom (e.g., for example, using at least one clamp connected to the top of the frame and two clamps connected to the bottom of the frame, etc.). The clamps are sized and shaped to connect to connection points of the printing device.

When the clamps connect the transport cart to the printing device and when the platform contacts the alignment stop (and is in the loading position), the platform slots are automatically positioned by the platform to be aligned with housing slots of the printing device. The printing device is positioned on the surface and the clamping aligns the platform slots with the housing slots regardless of irregularities of the surface. Thus, in item 210, the user easily slides the print module between the platform slots and the housing slots when the platform slots are aligned with the housing slots. The replaceable printing module is held by the linear projections when the linear projections are within the platform slots or the housing slots.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A transport cart comprising:
a frame having a top at one end, and a bottom at a second end, opposite said top, and at least one frame element between said top and said bottom, wherein said top, said bottom, and said frame element are separate elements of said frame;
wheels connected to said bottom of said frame, said wheels contact a surface on which said transport cart travels;
a platform connected to said frame between said top and said bottom;
a height adjuster connected to said platform, said height adjuster moves said platform along said frame in opposite directions between said bottom and said top;
an alignment stop connected to said frame between said bottom and said top, said platform contacts said alignment stop when said platform is in a loading position on said frame between said bottom and said top;
platform slots connected to said platform, said platform slots are sized and shaped to match a size and shape of linear projections of a print module; and
clamps connected to said frame at said top and said bottom, said clamps are sized and shaped to connect to connection points of a printing device,
said platform slots are positioned by said platform to be aligned with housing slots of said printing device when said clamps connect said transport cart to said printing device and when said platform contacts said alignment stop and is in said loading position,
said linear projections of said print module are held by said housing slots when said print module is mounted within said printing device,
said clamps comprising arms moving on hinges to open and close, and
said arms open and close to lock said clamps to said printing device.

2. The transport cart according to claim 1, further comprising a visual indicator connected to said alignment stop that indicates when said platform is in said loading position.

3. The transport cart according to claim 1, further comprising a visual indicator connected to said alignment stop that changes color when said platform is in said loading position.

4. The transport cart according to claim 1, said print module is capable of being slid between said platform slots and said housing slots only when said platform slots are aligned with said housing slots.

5. The transport cart according to claim 1, said height adjuster comprises:
a winch, a cable, and pulleys;
hydraulic adjusters; or
electrical motor adjusters.

6. The transport cart according to claim 1, said clamps comprise at least one clamp connected to said top of said frame and two clamps connected to said bottom of said frame.

7. The transport cart according to claim 1, said printing device is positioned on said surface and said clamps align said platform slots with said housing slots regardless of irregularities of said surface.

8. A transport cart comprising:
a cart frame having a top at one end, and a bottom at a second end, opposite said top, and at least one frame element between said top and said bottom, wherein said top, said bottom, and said frame element are separate elements of said cart frame;
wheels connected to said bottom of said cart frame, said wheels contact a surface on which said transport cart travels;
a platform connected to said cart frame between said top and said bottom;
a height adjuster connected to said platform, said height adjuster moves said platform along said cart frame in opposite directions between said bottom and said top;
an alignment stop connected to said cart frame between said bottom and said top, said platform contacts said alignment stop when said platform is in a loading position on said cart frame between said bottom and said top;
platform slots connected to said platform, said platform slots are sized and shaped to match a size and shape of linear projections of a replaceable printing module; and
clamps connected to said cart frame at said top and said bottom, said clamps are sized and shaped to connect to connection points of a printer frame of a printing device and align said cart frame to said printer frame,
said platform slots are positioned by said platform to be aligned with housing slots of said printing device when said clamps connect said transport cart to said printing device and when said platform contacts said alignment stop and is in said loading position, to allow said replaceable printing module to be transferred between said transport cart and said printing device,
said linear projections of said replaceable printing module are held by said housing slots when said replaceable printing module is mounted within said printing device,
said clamps comprising arms moving on hinges to open and close, and
said arms open and close to lock said clamps to said printing device.

9. The transport cart according to claim 8, further comprising a visual indicator connected to said alignment stop that indicates when said platform is in said loading position.

10. The transport cart according to claim 8, further comprising a visual indicator connected to said alignment stop that changes color when said platform is in said loading position.

11. The transport cart according to claim 8, said replaceable printing module is capable of being slid between said platform slots and said housing slots only when said platform slots are aligned with said housing slots.

12. The transport cart according to claim 8, said height adjuster comprises:
a winch, a cable, and pulleys;
hydraulic adjusters; or
electrical motor adjusters.

13. The transport cart according to claim 8, said clamps comprise at least one clamp connected to said top of said cart frame and two clamps connected to said bottom of said cart frame.

14. The transport cart according to claim 8, said printing device is positioned on said surface and said clamps align said platform slots with said housing slots regardless of irregularities of said surface.

15. A transport cart comprising:
- a frame having a top at one end, and a bottom at a second end, opposite said top, and at least one frame element between said top and said bottom, wherein said top, said bottom, and said frame element are separate elements of said frame;
- wheels connected to said bottom of said frame, said wheels contact a surface on which said transport cart travels;
- a platform connected to said frame between said top and said bottom;
- a height adjuster connected to said platform, said height adjuster moves said platform along said frame in opposite directions between said bottom and said top;
- platform slots connected to said platform, said platform slots are sized and shaped to match a size and shape of linear projections of a print module; and
- clamps connected to said frame at said top and said bottom, said clamps are sized and shaped to connect to connection points of a printing device,
- said platform slots are positioned by said platform to be aligned with housing slots of said printing device when said clamps connect said transport cart to said printing device, and
- said linear projections of said print module are held by said housing slots when said print module is mounted within said printing device,
- said clamps comprising arms moving on hinges to open and close, and
- said arms open and close to lock said clamps to said printing device.

16. The transport cart according to claim 15, further comprising:
- an alignment stop connected to said frame between said bottom and said top, said platform contacts said alignment stop when said platform is in a loading position on said frame between said bottom and said top; and
- a visual indicator connected to said alignment stop that indicates when said platform is in said loading position.

17. The transport cart according to claim 15, further comprising:
- an alignment stop connected to said frame between said bottom and said top, said platform contacts said alignment stop when said platform is in a loading position on said frame between said bottom and said top; and
- a visual indicator connected to said alignment stop that changes color when said platform is in said loading position.

18. The transport cart according to claim 15, said print module is capable of being slid between said platform slots and said housing slots only when said platform slots are aligned with said housing slots.

19. The transport cart according to claim 15, said clamps comprise at least one clamp connected to said top of said frame and two clamps connected to said bottom of said frame.

20. The transport cart according to claim 15, said printing device is positioned on said surface and said clamps align said platform slots with said housing slots regardless of irregularities of said surface.

* * * * *